United States Patent [19]

Raque et al.

[11] Patent Number: 4,991,375

[45] Date of Patent: Feb. 12, 1991

[54] HEAT SEAL CARRIER ASSEMBLY

[75] Inventors: Glen F. Raque; Edward A. Robinson, both of Louisville, Ky.

[73] Assignee: Raque Food Systems, Inc., Louisville, Ky.

[21] Appl. No.: 271,049

[22] Filed: Nov. 14, 1988

[51] Int. Cl.⁵ .................... B65B 7/28; B65B 51/10
[52] U.S. Cl. .......................... 53/329; 53/373; 156/220; 156/553; 156/581; 198/803.14
[58] Field of Search ............. 53/282, 329, 373, 478; 156/219, 220, 223, 224, 553, 580.2, 581, 583.2, 583.4; 198/803.14, 803.15; 219/243

[56] References Cited

U.S. PATENT DOCUMENTS

| | | | |
|---|---|---|---|
| 3,619,972 | 11/1971 | Pringle et al. | 53/329 X |
| 3,760,563 | 9/1973 | Zimmermann | 53/329 |
| 3,817,816 | 6/1974 | Watt | 53/329 X |
| 4,167,092 | 9/1979 | Medwed | 156/581 X |
| 4,227,067 | 10/1980 | McElroy | 219/243 |
| 4,490,961 | 1/1985 | Raque | 53/329 |
| 4,693,058 | 9/1987 | Kovacs | 53/379 X |

Primary Examiner—Robert L. Spruill
Assistant Examiner—Linda B. Johnson
Attorney, Agent, or Firm—Barnes & Thornburg

[57] ABSTRACT

A heat seal carrier assembly is provided for mating a covering material with a deformable sealing portion of a product-filled container to seal the container. The carrier assembly has an upstanding wall including a top surface having a raised ridge thereon. The container is situated on the carrier assembly to properly align the container sealing portion with the top surface of the upstanding wall of the carrier assembly. A heat seal head moves downwardly to press the covering material and the sealing portion of the container against the raised ridge and the top surface of the upstanding wall of the carrier assembly to seal the covering material and the sealing portion of the container together.

9 Claims, 3 Drawing Sheets

HEAT SEAL CARRIER ASSEMBLY

BACKGROUND AND SUMMARY

The present invention relates to an improved heat seal apparatus of the type used for mating a covering material with a product-filled container to seal the container. More particularly, the present invention relates to an improved carrier assembly for the heat seal apparatus which is configured to increase the sealing pressure in a sealing zone of at least the flange on the container to ensure that an acceptable seal is produced between the covering material and the flange of the container.

Conventional heat seal machines used for mating a covering material with the sealing areas of a product-filled container are well-known. Such heat seal machines generally are capable of heat sealing a covering material onto individual product-filled containers while the containers are continuously moving along a path. Such heat seal machines generally include some type of reciprocating carriage which reciprocates over the continuously moving path of containers, with the carriage matching the speed and direction of the moving containers for a period of time. Attached to the carriage is one or more heat seal heads which are moved upwardly and downwardly by some type of actuation device, normally a fluid cylinder. Each heat seal head is configured and oriented to be moved downwardly to come in contact with the covering material which has been routed over the opening in the product-filled containers, and to force the covering material into direct sealing contact with the sealing area on the container. Each heat seal head includes a heating element which, by thermal interaction with the covering material, causes the covering material to adequately seal against the container sealing area.

It has been found in such conventional heat seal machines that a ridge can be placed around the periphery of each heat seal head, with the ridge oriented to come into contact with a sealing area of the container flange. By placing this ridge, or raised portion on the downwardly face of each heat sealing head, the ridge thus comes in contact with the covering material and container sealing area before the remainder of the face of the heat sealing head, with the ridge creating an increased sealing pressure with respect to the sealing pressure created by the remainder of the face of the heat sealing head which comes in contact with the container. It has been found that this increased sealing pressure acts to ensure that an adequate seal is created around the entire sealing area of the container. It will be understood that it is necessary to ensure that adequate seals are provided around the entire sealing area, normally the flange of the container, in order to ensure the quality of the product within the container during storage. Because the flanges of the containers used on such heat seal machines are somewhat deformable, the ridge on the face of the heat sealing head acts to deform the flange to a greater extent in the sealing zone with respect to the deformation of the flange caused by the remaining portions of the heat sealing heads which come in contact with the flange. This increased deformation or increased compression of the flange in the designated sealing zone provides the localized increased sealing pressure necessary to ensure the adequate seal of the covering material with the flange.

One problem associated with conventional heat seal machines having the sealing ridge disposed on the heat seal head is that, because of the increased compression of the container flange caused by the raised ridge, a permanent indentation is formed in the top surface of the container flange after the seal has been completed. This permanent indentation creates a somewhat unattractive product container from a consumer acceptance point of view. Additionally, by creating a permanent indentation in the upper surface of the flange, the covering material is forced to conform to the contours of the indentation. Again, this permanent indentation of the covering material and of the top surface of the container flange presents a somewhat unattractive sealed container.

A more serious problem also presents itself in conventional heat seal machines having a raised ridge on the downwardly facing surface of the heat sealing heads. Because the heat sealing heads only move in unison with the continuously conveyed trays during a brief period of time, the mechanism for aligning the heat sealing heads with the moving trays during this period of time is prone to misalignment. It is possible for the heat seal heads to be misaligned or out of time with the movement of the containers if the timing mechanism of the machine is out of adjustment. The timing mechanism of the heat seal machine can become out of adjustment for several reasons, including chain stretch of the machine, general wear of the machine, and improper machine operator adjustments. In a heat seal machine which includes a raised ridge on a downwardly facing surface of the heat sealing head, any misalignment of the heat sealing head with respect to the containers will cause a misalignment and misplacement of the increased sealing pressure area out of the ideal sealing zone on the container. Again, the primary sealing area on most conventional containers is the container flange portion. This possible misalignment of the increased sealing area outside of the sealing zone is disadvantageous for several reasons.

First, because the ridge creates a permanent indentation in the top surface of the container flange, any misalignment or misplacement of the ridge results in a misaligned and obvious misplacement of the permanent indentation in the container flange. Such misalignment of the permanent indentation in the top surface of the container flange presents an obvious warning to the consumer that the seal of the container may be less than perfect. Second, any misalignment or misplacement of the increased sealing area can have adverse effects on the actual seal created between the covering material and the container. Thus, quality control of the seal containers can be adversely affected, which increases the cost because of inadequately sealed containers which must be removed from the assembly line after the sealing process.

It is therefore one object of the present invention to provide a heat seal apparatus that is capable of creating an increased sealing pressure in the sealing zone of a container to produce an acceptable, consistent seal without creating a permanent indentation in the upper surface of the container.

Another object of the present invention is to provide a heat seal apparatus that is capable of creating an area of increased sealing pressure in the sealing zone of the container and in which the orientation and alignment of the increased pressure area is consistent, and does not depend upon the position and alignment of the heat seal head.

According to the present invention, an apparatus for mating a covering material with at least deformable outwardly extending flange portion of a product-filled container to seal the container is provided. The apparatus includes means for providing a covering material over the container opening and over the container flange. The apparatus also includes means for applying a downwardly directed force of a specified magnitude to the covering material and to at least the container flange to mate the covering material to the flange. A support member or carrier plate is provided that is oriented to oppose the force exerted by the applying means, with the support member and applying means cooperating to compress the container flange in response to the force exerted by the applying means. The support member includes first and second portions for compressing the container flange, with the first portion having a first cross-sectional area and the second portion having a second cross-sectional area. The second portion is elevated above the first portion a specified distance such that the second portion compresses the flange a greater amount relative to the compression of the flange by the first portion. By providing an increased compression area on the underneath side of the container flange, the sealing pressure exerted on the covering material by the second portion is greater than the sealing pressure exerted on the covering material by the first portion.

One feature of the foregoing structure is that the lower support member includes a raised second portion having a second cross-sectional area. One advantage of this feature is that the raised second portion acts as a ridge to increase the sealing pressure in the area of the ridge to provide an adequate seal of the covering material on the upper surface of the flange.

In preferred embodiments of the present invention, the support member includes an upstanding wall which has an upwardly facing top section, with the top section formed to include both the first portion and the raised second portion. Also in preferred embodiments of the present invention, the first portion of the top section of the upstanding wall includes two generally planar ledges, with the second elevated portion interposed between these two ledges. One feature of the foregoing structure is that the raised second portion is interposed between two lower ledge-like first portions. One advantage of this feature is that, when the applying means forces the deformable container flange against the upstanding wall, the compression of the container flange is greater in the area of the second portion with respect to the compression of the container flange in the area with respect to the two first portions. Thus, an increased pressure sealing area is created in the vicinity of the second portion of the upstanding wall.

Also in preferred embodiments of the present invention, the applying means includes a multi-stage fluid cylinder assembly that is capable of imposing a preselected, adjustable, downwardly directed force on to the covering material and to the container flange. One feature of the foregoing structure is that the multi-stage fluid cylinder is adjustable, and is capable of providing a preselected, downwardly directed force on the heat seal head, and thus on the covering material and container flange. One advantage of this feature is that the applying means can be adjusted, depending upon the characteristics of the material forming the container flange.

Thus, the present invention provides a heat seal apparatus which is capable of producing an increased sealing pressure in a selected sealing zone of the container. Unlike conventional heat seal machines with a ridge on the heat seal head to provide an increased sealing pressure, the present invention incorporates the ridge on a lower support member of the apparatus so that any permanent indentation of the container is located on the underneath side of the container sealing zone. Thus, the top surface of the container flange and the covering material cooperate with the ridge positioned beneath the container to affect an adequate seal around the entire sealing area, without the disadvantages associated with any type of permanent indentation in the top surface of the container.

Additional objects, features, and advantages of the invention become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
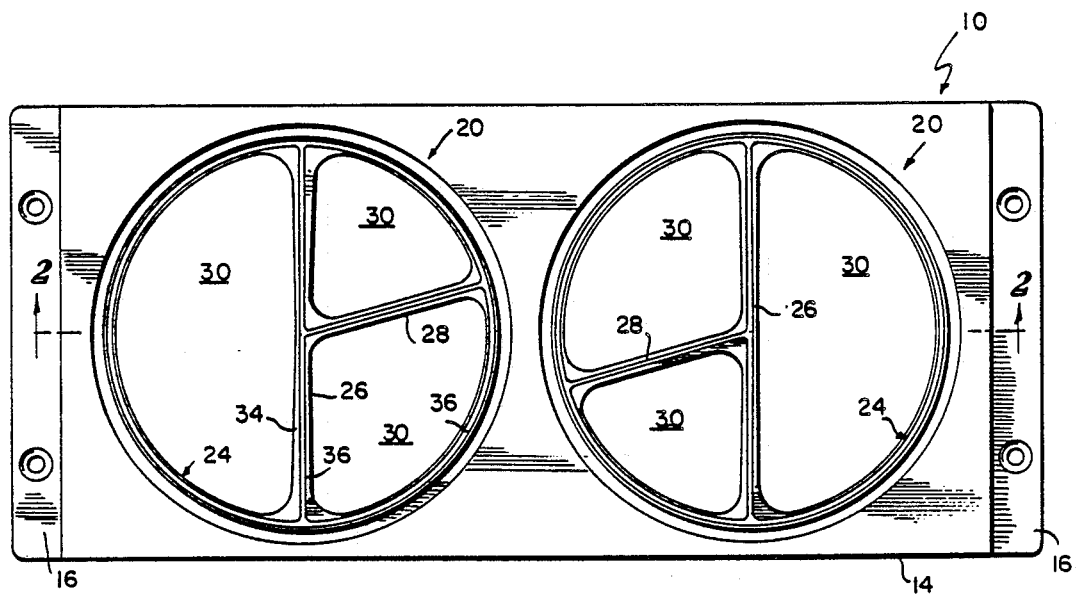
FIG. 1 is top plan view of the carrier assembly according to the present invention.

Referring now to the drawings, FIG. 1 illustrates a carrier assembly 10 according to the present invention. The carrier assembly 10 includes a generally planar carrier plate 14 which includes chain attachment portion 16 disposed at the opposite distal ends. The chain attachment portions 16 are provided to permit attachment of the carrier assembly 10 to moving chains (not shown) which act to convey the carrier assembly 10 through the heat seal device illustrated in FIG. 3.

Figure 4:
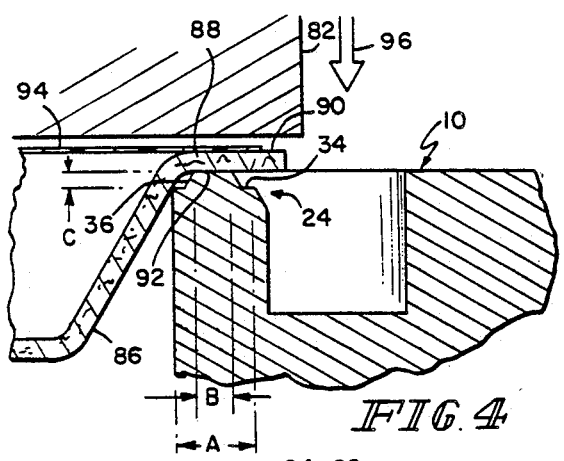
FIG. 4 is an enlarged sectional view of a portion of the heat seal heat platen part to engagement with the covering material and flange portion of the container, with the flange of the container being supported by the lower support member.
Figure 5:
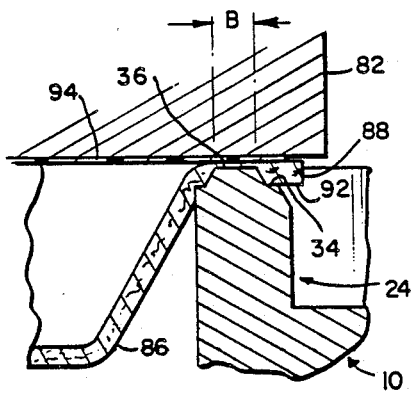
FIG. 5 is a view similar to FIG. 4 with the sealing process completed.

The plate 14 is formed to include two product tray receiving portions 20, each of which is configured and sized to receive a single product tray (shown in FIGS. 4 and 5). It will be understood that the present invention is not limited to any specific configuration of the tray, and that the shapes of the product tray receiving portions 20 illustrated in FIG. 1 are for illustrative purposes only. The tray receiving portions 20 could be formed to receive any type of product tray, including rectangular trays, circular trays without partitions, or any other configuration that might be used in the food packaging industry.

Each product tray receiving portion 20 includes a circular upstanding wall 24 which is oriented to extend around the entire periphery of a circular product tray or container. A straight upstanding wall 26 is positioned to extend between the circular upstanding wall 24, and serves to support one of the dividing lines between partitions in the product tray. Additionally, another straight upstanding wall 28 which is shorter than the upstanding wall 26 is provided, again to support another of the divisions between additional partitions in the tray. Between the circular upstanding wall 24 and the straight upstanding walls 26, 28, apertures 30 are formed for receiving the product-containing portions of the product tray. In the preferred embodiment, the apertures 30 are formed completely through the plate 14.

The circular upstanding wall 24 and the straight upstanding walls 26, 28 each terminate in top surfaces 34 which are positioned and oriented to contact and support both the outwardly extending flange of the product tray (FIGS. 4 and 5) and the dividing partitions of the tray. It will be understood that, although somewhat complex tray receiving portions 20 are illustrated, if either rectangular or square shaped trays were being used, the tray receiving portions 20 would be correspondingly shaped, and an outer upstanding wall would be provided only to contact the outwardly extending flange of such trays. However, with the tray receiving portions 20 as illustrated, it is also advantageous to provide the straight upstanding walls 26, 28 so that when the sealing process is accomplished which mates a covering material (illustrated in FIGS. 4 and 5) with the outwardly extending flange of the product tray, sealing also takes place over the partition walls.

Figure 2:
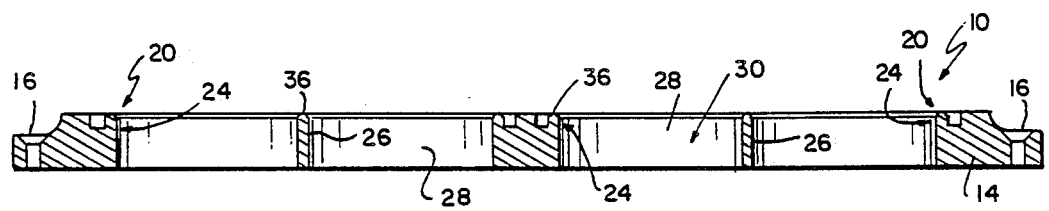
FIG. 2 is a sectional view taken along lines 2—2 of FIG. 1.
Figure 8:
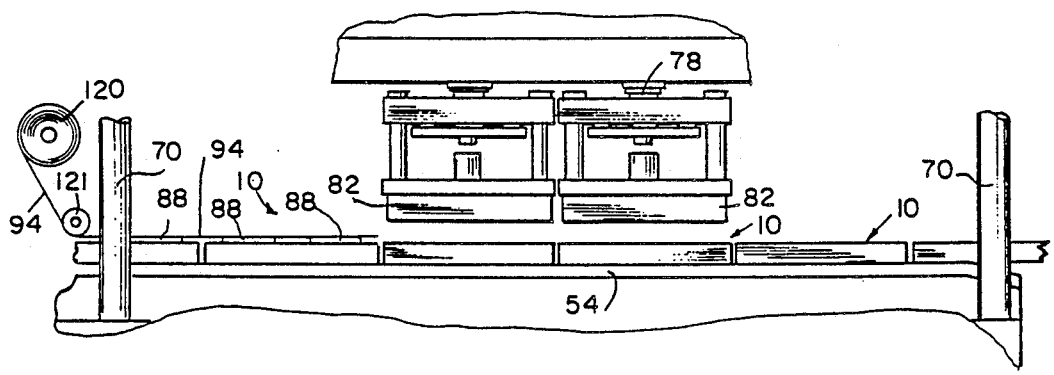
FIG. 8 is a schematic representation similar to FIG. 3 showing the feeding mechanism for the covering material.

The top surface 34 of both the circular upstanding wall 24 and the straight upstanding walls 26, 28 are provided with a raised ridge 36. This raised ridge is more clearly shown in FIG. 2 which is a sectional view taken through FIG. 1. The ridges 36 are raised above the top surface 34 to concentrate the sealing pressure provided by the conventional sealing heads (illustrated in FIG. 3) to create a high pressure sealing area in both a sealing zone of the outwardly extending flange of the container and along the partition divisions. This high pressure sealing area enhances the seal quality obtainable between the covering material 94, which is directed onto the upper side of the containers form a storage roll 120 and guide roller 121 as illustrated in FIG. 8 and the container to ensure that adequate sealing is provided to enhance the storage capabilities of the sealed container. By concentrating the sealing force provided by the sealing head over the smaller area defined by the upper portion of the ridge 36, the sealing pressure in pounds per square inch is thus increased. This increased sealing pressure is communicated through the flange of the container and the partition dividers of the container so that the increased sealing pressure results in better sealing of the covering material which is normally a heat sealable film or other similar type material.

Figure 3:
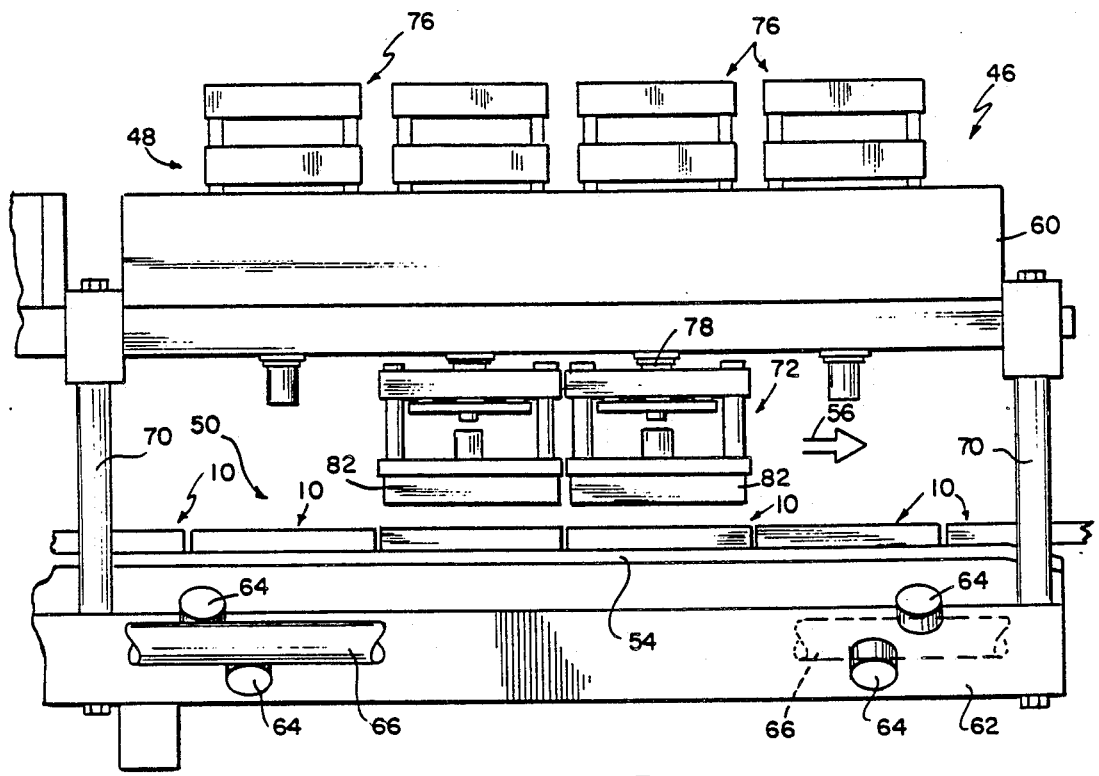
FIG. 3 is a front elevational view of the heat seal machine incorporating the carrier assembly illustrated in FIG. 1.

FIG. 3 illustrates a typical heat seal device 46 which includes the carrier assembly 10 aCcording to the present invention. Specifically, the heat seal device 46 is designed for continuous movement of product containers (not shown) and therefore is provided with a series of carrier assemblies 10 which are continuously conveyed in the direction of arrow 56. The heat seal device 46 includes a reciprocating carriage assembly 48 which is adapted for reciprocating movement over the conveying assembly 50 which carries the trays in the direction of arrow 56. The mechanism for permitting the carriage assembly 48 to reciprocate over the conveying assembly 50, and the operation of the entire heat seal device 46, are conventional and well known in the art. Specifically, reference is made to U.S. Pat. No. 4,490,961 to Glenn F. Raque, the entire disclosure which is herewith incorporated by reference, to disclose one example of a reciprocating carriage assembly in use on a typical heat seal machine. In the embodiment illustrated in FIG. 3, permanent track-like carrier supports 54 are provided for supporting and guiding the continuously conveyed carrier assemblies 10. A continuous chain drive (not shown) is attached to the chain attachment portions 16 of each carrier assembly 10 to move the stream of carrier assemblies 10 in the direction of arrow 56.

The reciprocating carriage assembly 48 includes an upper portion 60 and an opposite lower portion 62. As can be seen in FIG. 3, the upper portion 60 and lower portion 62 are oriented and arranged to straddle the conveying assembly 50 and the continuously moving stream of carrier assemblies 10. As disclosed in the above-referenced patent, the reciprocating carriage assembly 48 is configured for reciprocating movement over the continuously moving stream of carrier assemblies 10. During a portion of the movement of the carriage assembly 48, the carriage assembly 48 will both match the speed and direction of the moving carrier assemblies 10. It is during this coordinated movement of the carriage assembly 48 and the carrier assemblies 10 that the actual sealing of the containers carried by the carrier assemblies 10 is accomplished. This actual sealing operation will be discussed below in the discussion related to FIGS. 4 and 5.

The lower portion 62 and the carriage assembly 48 includes rollers 64 which enable the carriage assembly 48 to move both in the direction of the arrow 56 and opposite the direction of the arrow 56 on a support bar 66. It will be understood that the support bar 66 is stationary. Upright supports 70 are provided to link the upper portion and the lower portion 62 of the carriage assembly 48. Heat seal heads 72 are attached to the upper portion 60, with the heat seal heads 72 moveable both upwardly and downwardly, with the downward movement acting to engage the covering material (FIGS. 4 and 5) with the containers in the carrier assembly 10 during the sealing operation. Although only two sealing heat seal heads 72 are shown in FIG. 3, it would be conventional to include four heat seal heads in each reciprocating carriage assembly 48.

Multi-stage fluid cylinder assemblies 76 are provided in the upper portion 60 to move the heat seal heads 72 upwardly and downwardly. Each multi-stage fluid cylinder assembly 76 is connected to the corresponding heat seal head 72 by a piston rod 78. Each multi-stage fluid cylinder assembly 76 is a conventional fluid cylinder which may by operated either by pneumatic or by hydraulic actuation. In the preferred embodiment, each fluid cylinder assembly 76 is a multi-stage cylinder, with the multiple stages acting to increase the force exerted by the cylinder assembly 76 without increasing the fluid pressure necessary to activate the cylinder assembly 76.

In one embodiment, it has been found useful to utilize a pneumatic cylinder having three stages with a five inch bore. With 80 PSI activation pressure introduced into the cylinder assembly 76, a resulting force of approximately 4,500 pounds of thrust can be realized. It has generally been found that it is not necessary to go beyond a five-stage pneumatic cylinder with a five inch bore, and no greater than 100 PSI pneumatic activation pressure. It will be understood that the ability to vary the force exerted on the individual heat seal heads 72 is advantageous because, when different types of containers formed from different types of materials are utilized, different sealing pressures are necessary to achieve adequate sealing.

Each heat seal head 72 includes a downwardly-facing platen surface 82 which is provided to contact both the covering material and the sealing portions of the container. In a conventional manner, the platen 82 is normally capable of producing a required amount of heat to produce the seal between the covering material and the container sealing portions. Again, the typical type of covering material is a heat sealable film or other type of comparable material.

FIG. 4 illustrates in greater detail both the structure of the circular upstanding wall 24 and the ridge 36, and the orientation of a tray 86 when fitted into one of the product tray receiving portions 20. Additionally, FIG. 4 illustrates the movement of the platen portion 82 of one heat seal head 72 to a position where a covering material 94 will be sealed against an outwardly extending flange portion 88 of the tray 86. The outwardly extending flange 88 includes a top surface 90 and a bottom surface 92. The covering material 94 has been introduced over the top surface 90 in a conventional manner by a mechanism which is not shown. FIG. 4 clearly shows the orientation of the ridge 36 being substantially in the center of the top surface 34 of the upstanding wall 24. The ridge 36 is raised above the level of the top surface 34 a distance illustrated by the dimension C. In the preferred embodiment, this distance C is about 0.027 inches. Additionally, the width of the upper portion of the ridge 36 is illustrated by the dimension B. In the preferred embodiment, this dimension B is approximately 0.074 inches. The width of the top surface 34 of the upstanding wall 24 is illustrated by the dimension A. Again, in the preferred embodiment the dimension A is approximately 0.144 inches.

The top portion of the ridge 36 creates an increased pressure sealing area relative to the remainder of the top surface 34 of the upstanding wall 24. As the platen 82 moves downwardly in the direction of arrow 96, the platen 82 will contact both the covering material 94 and the top surface 90 of the flange 88 to begin the sealing operation. As the platen 82 continues its downward movement, the flange will begin to be compressed by the ridge 36, followed by lesser compression due to interaction with the remainder of the top surface 34. The increased compression imposed by the ridge 36 creates an increased pressure sealing area or increased sealing zone having a width substantially equal to the dimension B.

FIG. 5 illustrates the configuration of the flange 88 and covering material 94 after the platen 82 has been lowered to its lowermost position. As can be clearly seen, the portion of the flange 88 in the vicinity of the ridge 36 has been compressed significantly more than the compression of the remaining part of the flange 88 by the top surface 34. It is this increased compression of the sealing zone of the flange 88 which creates the increased pressure sealing area to affect the adequate seal of the covering material 94. As can be seen, the compression of the flange 88 by the ridge 36 creates an indentation in the bottom surface 92 of the flange 88.

Figure 6:
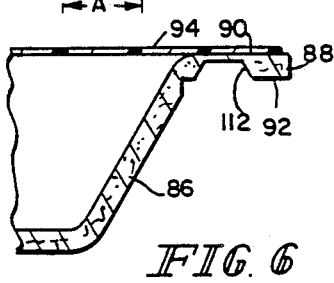
FIG. 6 is a view similar to FIG. 5 with the sealed container extracted from the heat seal machine.
Figure 7:
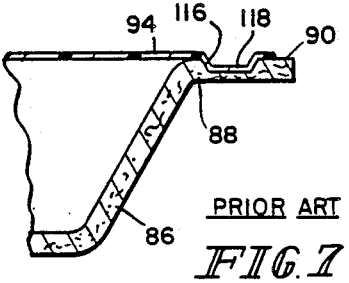
FIG. 7 is a view similar to FIG. 6 showing a sealed container that has been sealed by a prior art heat seal machine.

FIG. 6 illustrates a portion of the tray 86 after it has been removed from the heat seal device 46. Specifically, FIG. 6 illustrates the location of the indentation 112 which has been caused by the ridge 36. This indentation is on the bottom surface 92 of the flange 88 and thus is not visible when the tray 86 is viewed from above by a consumer. This is in direct contrast to the prior art as illustrated in FIG. 7. In the prior art device, a ridge is placed on the lower surface of the platen 82 to provide the increased pressure sealing area. However, with the ridge on the lower surface of the platen 82, a permanent indentation 116 is formed in the top surface of the flange 90. This permanent indentation also causes a permanent indentation 118 of the covering material 94. Thus, when the prior art as illustrated in FIG. 7 is viewed from the top by a consumer, an unattractive permanent indentation 116 is seen around the flange 88.

It is also possible in the prior art devices for the indentation 116 to be misplaced somewhat in the top surface 90 of the flange 88. This misplacement or misalignment of the indentation 116, and thus of the increased pressure sealing area, may be caused by misalignment of the sealing heads 72, or of the entire carriage assembly 48. In the prior art device, with the sealing ridge formed as part of the sealing head 72, perfect alignment of the sealing head 72 with respect to the moving containers 86 is required for accurate placement of the increased pressure sealing area and thus the indentation 116 in the flange 88 of the tray 86. Misalignment of the sealing head 72 and of the carrier assembly 46 can be caused by chain stretch of the machine, general wear of the machine, and improper machine operator adjustments. However, as illustrated in FIG. 6, the device according to the present invention overcomes these problems by having the ridge on the lower support or upstanding wall 24 of the device. By locating the ridge 36 on the upstanding wall 24, and on the upstanding walls 26, 28, the increased pressure sealing area caused by the ridge 36 is always in proper alignment with the tray 86.

Thus, the present invention provides a heat seal device, and specifically a carrier assembly for a heat seal device which is capable of producing an increased pressure sealing area in a sealing zone on a container such that an effective seal between the container sealing portions and a covering material is produced. The increased pressure sealing area is always positioned properly with respect to the tray because the ridge creating the increased pressure sealing area is mounted on the support which positions the tray before sealing. Additionally, by placing the ridge on the lower support of the tray, any permanent indentation formed in the sealing portions of the tray, are hidden from normal consumer view. Thus, the trays packaged with the present invention are assured of an adequate seal around the entire sealing portion of the tray, and also present an attractive appearance to the consumer.

Although the invention has been described with reference to a preferred embodiment and specific examples, variations and modifications exist within the scope and spirit of the invention as defined in the following claims.

What is claimed is:

1. An apparatus for mating a covering material with a deformable sealing portion of a product-filled container to seal the container without substantial deformation of the covering material, the apparatus comprising, means for providing a covering material over the container opening and the container sealing portion, a heat seal head having a substantial flat planar, downwardly facing surface across an entire sealing area for contacting the covering material for sealing the covering material to a portion of the container even during minor misalignment of the heat seal head, means for applying a downwardly directed force of a specified magnitude to the heat seal head to move the substantially flat planar surface of the head downwardly against the covering material and toward the container sealing portion, and a support member for supporting an underside area of the container sealing portion and oriented to oppose the force imposed by the applying means for compressing the container sealing portion in response to the force executed by the applying means, the support member having first and second portions for compressing the container sealing portion, the first portion having a first cross-sectional area and the second portion having a second cross-sectional area, the second portion elevated above the first portion a specified distance such that the second portion compresses the container sealing portion a greater amount relative to the compression of the sealing portion by the first portion such that the underside area of the sealing portion of the second portion is substantially deformed by the sealing pressure while an upwardly facing surface of the sealing portion located directly above the deformed underside area maintains its configuration so as to provide for a sealing of the covering material without any substantial deformation of the covering material and to also permit minor misalignment of the seal head with respect to the support member.

2. The apparatus of claim 1, wherein the support member comprises an upstanding wall which includes an upwardly facing top section, with the top section including both the first portion and the raised second portion.

3. The apparatus of claim 1, wherein the applying means comprises a multi-stage fluid cylinder that imposes a preselected, downwardly directed force on the covering material.

4. The apparatus of claim 1, further comprising means for continuously conveying the container along a path in a first direction and at a preselected speed and means for moving the applying means over the moving container such that the speed and direction of the applying means matches the speed and direction of the container along a portion of the path of movement of the container.

5. An apparatus for mating a covering material with a deformable sealing portion of a product-filled container to seal the container, the apparatus comprising, means for providing a covering material over the container opening and the container sealing portion, a heat seal head having a planar, downwardly facing surface for contacting the covering material for sealing the covering material to a portion of the container, means for applying a downwardly directed force of a specified magnitude to the heat seal head to move the head downwardly toward the container sealing portion, and a support member for supporting the container sealing portion and oriented to oppose the force imposed by the applying means for compressing the container sealing portion in response to the force executed by the applying means, the support member having first and second portions for compressing the container sealing portion, the first portion having a first cross-sectional area and the second portion having a second cross-sectional area, the second portion elevated above the first portion a specified distance such that the second portion compresses the container sealing portion a greater amount relative to the compression of the sealing portion by the first portion such that the sealing pressure exerted on the covering material by the first portion is less than the sealing pressure exerted on the covering material by the second portion wherein the support member comprises an upstanding wall which includes an upwardly facing top section, with the top section including both the first portion and the raised second portion; and wherein the first portion of the top section comprises two generally planar ledges, with the second elevated portion interposed between the two ledges.

6. The apparatus of claim 5, wherein the second portion is raised a distance of about 0.027 inches above the two ledges.

7. A carrier plate for a heat seal packaging device of the type having a stream of moving containers conveyed along a path, each container supported by the carrier plate, and at least one heat seal head that forces a covering material into sealing relation with a sealing portion of one of the containers to seal the container, the carrier plate comprising, an upright member that is sized and oriented to engage the container sealing portion to retain the container in a proper orientation for receiving the covering material, the upright member having a top section that includes a raised second portion interposed between two lower first portions, with the two first portions coplanar with each other, whereby when the heat seal head forces the covering material into sealing relation with the container sealing portion, the container sealing portion will be compressed a first amount by the first portion and a greater second amount by the raised second portion to increase the sealing pressure in the area of the second portion.

8. In a carrier plate having an upwardly extending wall for supporting a product container in a heat seal packaging device of the type having a heat seal head that has a substantially flat planar surface across an entire sealing area and that forces a covering material against an outwardly extending flange of the container to seal the covering material to the container without substantially deforming the covering material and while applying substantial deformation to the outwardly extending flange of the container, the improvement comprising an upwardly extending, generally planar portion formed on a top portion of the upwardly extending wall, with the raised planar portion spaced above the top section a first distance so that when the container flange is wedged between the upwardly extending wall and the heat seal head, the upwardly extending planar portion will contact and compress the container flange a greater amount than the top section of the wall to increase the sealing pressure in the area of the raised planar portion relative to the sealing pressure in the area of the top section of the wall without substantially deforming the covering material atop the substantially deformed portion of the flange.

9. The improvement of claim 8, wherein the first distance is about 0.027 inches.

* * * * *